April 29, 1924.
H. P. KRAFT
1,492,077
DUST CAP FOR TIRE VALVES AND THE LIKE
Original Filed Jan. 11, 1921
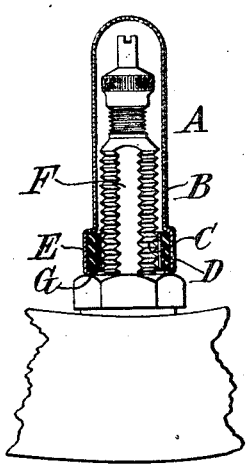
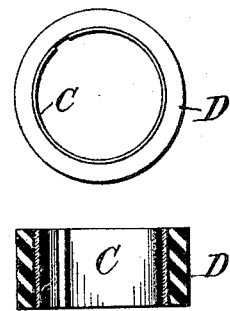
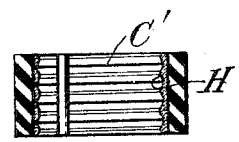
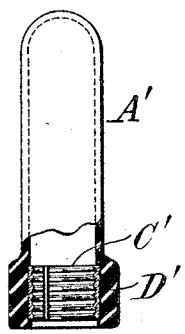
INVENTOR
Henry P. Kraft
BY
ATTORNEYS Patented Apr. 29, 1924.

1,492,077

UNITED STATES PATENT OFFICE.

HENRY P. KRAFT, OF RIDGEWOOD, NEW JERSEY.

DUST CAP FOR TIRE VALVES AND THE LIKE.

Application filed January 11, 1921, Serial No. 436,424. Renewed August 10, 1923.

*To all whom it may concern:*

Be it known that I, HENRY P. KRAFT, a citizen of the United States of America, residing in Ridgewood, in the county of Bergen and State of New Jersey, have invented certain new and useful Improvements in Dust Caps for Tire Valves and the like, of which the following is a specification.

This invention relates to dust caps for tire valves and the like, and aims to provide certain improvements therein.

The invention is directed to a dust cap of the friction type which is designed to slide over the casing of a tire valve, in either direction, holding its adjusted position by a frictional grip upon the casing.

According to the present invention, I provide a cap of this type in which the frictional member is metallic or formed of other material of a non-resilient character, being preferably in the form of a split metal band. It is mounted in the dust cap with a backing of resilient material, such as rubber. The resilient backing may be applied to any suitable form of cap and may be of different material, or the cap itself may be made of rubber or rubber composition, either elastic or otherwise, in which case the backing may be integral with the cap. Other features of this invention will be hereinafter more fully pointed out.

Referring to the drawings which illustrate several forms of the invention,—

Figure 1 is a diametrical section of one form of the improved cap, shown as applied to the tire valve.

Fig. 2 is a plan of the friction member with its resilient backing.

Fig. 3 is a diametrical section of Fig. 2.

Fig. 4 is a similar section of a slightly modified form.

Fig. 5 is an elevation, partly in diametrical section, showing the invention as applied to a rubber cap.

Referring first to Figures 1 to 3, let A represent the dust cap as a whole which comprises a cap portion B, a friction member C and a backing D.

In Fig. 1, the cap portion B is shown as formed of drawn sheet metal having an enlarged foot E, which provides an annular recess on the interior of the cap. The friction member C is preferably made of metal, or, it may be constructed of other non-resilient material. It is shown as a band but may be constructed of a plurality of bands or rings. As shown, it is preferably split, so as to be capable of yielding to pass over the threads of a tire valve F.

Between the band C and the wall of the cap is the resilient backing D, which is shown as formed as a rubber ring or sleeve. As best constructed, the friction member C is vulcanized to the interior of the sleeve D, or they are provided with other interengaging means, so that the band holds its position in the sleeve D.

As illustrated in Fig. 1, the recess at the foot of the cap is best so proportioned so it does not completely receive the sleeve D. By this means the band C is capable of considerable expansion before it becomes flush with the interior wall of the cap portion.

When constructed, as thus described, the cap has a firm frictional grip upon the tire valve casing, while at the sime time it is very easily and smoothly passed along the threads of the valve. It is not necessary to provide any special means of connection between the backing and the cap, the backing holding its position within the recess of the cap, without special means of attachment. In constructing the cap, its sleeve D and band C may be introduced, and a flange G of the cap portion turned over the sleeve, or the cap portion may be manufactured complete and the sleeve D compressed and introduced through the bottom of the cap.

Figure 4 shows a slight modification, in that the band C' is formed with undulations or threads H which are made very blunt and shallow, so as not to unduly interfere with the passing over the threads of the valve casing.

In Fig. 5 I have shown a construction in which a cap A' is made of rubber throughout, elastic rubber being preferred. The bottom of the cap is thickened to form a backing D' within which is located the friction member such as C or C'. In this case the friction member is preferably vulcanized in the cap during the process of manufacture of the latter.

While I have shown and described several forms of the invention, it will be understood that I do not wish to be limited thereto, since various changes may be made therein without departing from the spirit of the invention.

What I claim is:—

1. A dust cap for tire valves and the like, comprising a cap portion, a frictional member, and a resilient backing for the frictional member.

2. A dust cap for tire valves and the like, comprising a cap portion, a frictional member formed of non-resilient material, and a resilient backing for the frictional member.

3. A dust cap for tire valves and the like, comprising a cap portion, a frictional member comprising a split band, and a resilient backing for such frictional member.

4. A dust cap for tire valves and the like, comprising a cap portion, a resilient sleeve in said cap portion, and a frictional member of non-resilient material within said sleeve.

5. A dust cap for tire valves and the like, comprising a cap portion, a recess in the bottom of said cap portion, a rubber sleeve in said recess, and a metallic friction member within said rubber sleeve.

6. A dust cap for tire valves and the like, comprising a cap portion, and a frictional member comprising a split band having a corrugated interior face, the corrugations being disposed at an angle to the longitudinal axis of the cap, said frictional member being connected with said cap portion.

7. A dust cap for tire valves and the like, comprising a cap portion, a frictional member comprising a split band having a corrugated interior face, said frictional member being connected with said cap portion, and a resilient backing for said frictional member.

In witness whereof, I have hereunto signed my name.

HENRY P. KRAFT.